United States Patent [19]
Balch et al.

[11] Patent Number: 6,113,238
[45] Date of Patent: Sep. 5, 2000

[54] GLARE DEMONSTRATOR

[75] Inventors: Thomas Balch, Rancho Palos Verdes;
Russell E. Evans, Chino Hills;
Gregory Alan Rook, Claremont;
Nancy L. S. Yamasaki, Long Beach,
all of Calif.

[73] Assignee: Younger Mfg. Company, Torrance, Calif.

[21] Appl. No.: 09/249,865

[22] Filed: Feb. 16, 1999

Related U.S. Application Data

[60] Provisional application No. 60/074,935, Feb. 17, 1998, and provisional application No. 60/105,460, Oct. 23, 1998.

[51] Int. Cl.$^7$ ....................................................... A61B 3/02
[52] U.S. Cl. .................................................... 351/232
[58] Field of Search .................................. 351/223, 224, 351/227, 232, 237, 243, 244; 345/7, 9; 359/465, 477, 451, 618, 629, 601

[56] References Cited

U.S. PATENT DOCUMENTS

| | | |
|---|---|---|
| 3,654,631 | 4/1972 | Baratelli . |
| 3,700,883 | 10/1972 | Donohoe et al. . |
| 4,800,404 | 1/1989 | Ginsburg et al. . |
| 5,400,177 | 3/1995 | Petitto et al. ............................ 359/451 |
| 5,486,840 | 1/1996 | Borrego et al. . |
| 5,797,050 | 8/1998 | Smith ..................................... 396/241 |
| 5,946,139 | 8/1999 | Barak ..................................... 359/618 |

*Primary Examiner*—George Manuel
*Attorney, Agent, or Firm*—Fulbright & Jaworski L.L.P.

[57] ABSTRACT

A device for demonstrating the effect of glare and its reduction in which light is reflected onto a glare panel, to reflect therefrom at an angle of incidence such that it is horizontally polarized, producing glare to one viewing an underlying graphic but which glare is eliminated by viewing through vertically polarized lenses.

25 Claims, 7 Drawing Sheets

GLARE DEMONSTRATOR

CROSS REFERENCE TO RELATED APPLICATIONS

This applications claims the benefit of Provisional patent application Nos. 60/074,935 filed Feb. 17, 1998 and 60/105,460 filed Oct. 23, 1998.

BACKGROUND OF THE INVENTION

A major advantage of eye glasses containing polarized lenses is the ability to reduce glare from light striking reflecting surfaces. Such glare is particularly acute when reflected from water surfaces, the surface of snow, from shiny car hoods or roadways and generally is polarized in a plane parallel to the surface. Polarized sunglasses reduce glare by having a vertical transmission axis, but blocking the dominantly horizontally polarized reflected light from horizontal surfaces. The reduction in glare by polarized lenses can be dramatic but is not fully appreciated by many members of the public who purchase sunglasses and who often are more concerned with the tint and general reduction of light provided by sunglasses rather than the selective reduction of polarized light. At the retail store where such glasses are sold, polarized lenses are often not adequately described, either due to a lack of trained personnel or because of an inability to adequately communicate the significant advantages of Polarized lenses.

A previous attempt to address this problem has been made by the provision of a glare producing view box wherein the customer is asked to look at a graphic, such as a photographic scene, through a clear pane (which can be referred to as a glare pane) of transparent material. Such a device is shown in FIG. 1 in which a housing 10 carries a graphic 12 on its base with a glare pane 14 of transparent material. A translucent panel 16 overlies a pair of elongated fluorescent bulbs, one of which, at 18 is shown, transmit diffused light directly onto the glare pane 14 so that a portion of the light reflects from the glare pane 14 while other portions illuminate the graphic and reflect from the graphic through the glare pane 14 to the eyes of the viewer. The viewer is provided with a lorgnette containing polarized lenses and views the scene with and without using the lorgnette. While such a device provides some glare, is not sufficient to veil the graphic and therefore does not provide a dramatic demonstration of the effectiveness of polarized lenses. The inability of the device to produce veiling glare can be attributed the use of simple diffused light and its application directly to the glare pane. Moreover, the open structure of the housing allows unpolarized light from the diffusion panel to impinge directly on the eyes of the viewer, effectively washing out the image seen through the Polarized lenses, decreasing the perception of dramatic improvement.

A need, therefore, exists for a glare demonstrator that creates veiling glare across a graphic when viewed without polarizing lenses and which enables the scene depicted by the graphic to be seen clearly through polarizing lenses. The device must be sufficiently compact for a retail setting and sufficiently easy to use so that the customer can see the effect of polarizing lenses without the need for trained personnel.

BRIEF SUMMARY OF THE INVENTION

The present invention provides a glare demonstrator which meets the foregoing needs. It is compact, intuitively easy to use, and creates a veiling glare across the graphic image when that image is viewed directly, but the scene provided by the graphic is seen clearly when the graphic is viewed through polarizing lenses. The veiled image and the clear image are distinct, providing a dramatic illustration of the phenomenon of glare and its significant reduction through the use of polarizing lenses.

In particular, the glare demonstrated by this invention illuminates the graphic through a glare pane with a first portion of light and reflects a second portion of light onto the glare pane to reflect from the glare pane at an angle of incidence such that it is polarized and produces glare to one viewing the graphic. The angle of incidence of the light reflected on the glare pane is preferably at about Brewster's angle. In a particular embodiment, the glare producing light is scattered before it reaches the glare pane by means of a refractive pane formed of transparent, multi-faceted refractive material disposed in the path of the light that is reflected onto the glare pane.

In a specific embodiment, a fluorescent bulb is disposed within a housing containing the graphic and glare pane, a first portion of the light illuminating the graphic through the glare pane while a second portion thereof is reflected from a mirrored surface in the housing at the polarizing angle of incidence. The refractive pane can be located directly in front of, spaced from, the mirrored surface. A front wall of the housing defines an opening through which the graphic is viewed and includes a baffle extending from a top edge of the opening into the housing at an angle from the front wall, whereby shield the eyes of a viewer of the graphic from light coming directly from the bulb. In a further particular embodiment, the housing supports the graphic at a first angle from horizontal and supports the glare pane at second angle from horizontal. The second angle is such that the angle of incidence of the light reflected from the mirrored surface is at Brewster's angle. Other embodiments are described below.

For convenience, a cradle is located on the top wall of the housing that is shaped to receive the bottom half of a lorgnette fitted with polarized lenses.

DETAILED DESCRIPTION OF THE INVENTION

Figure 1:
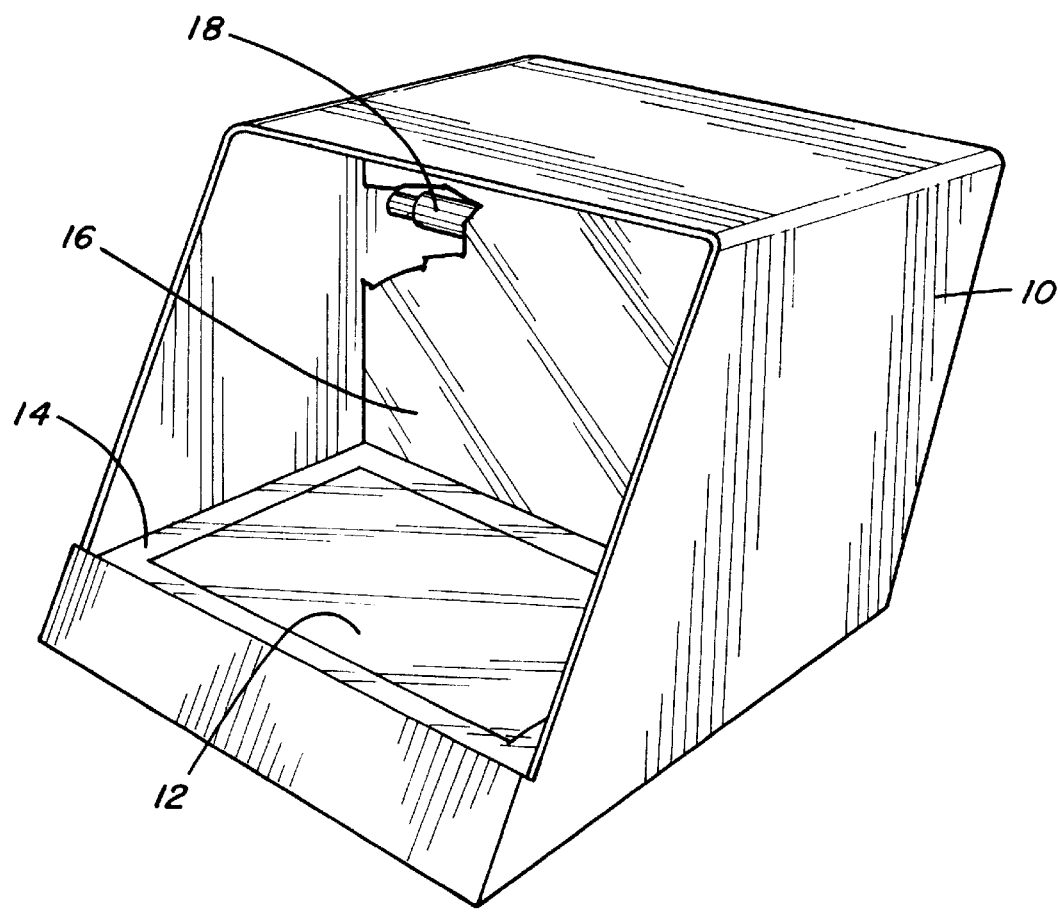
FIG. 1 is a perspective, generally front view, partially in cross section, partially in shadow, of a glare demonstrator of the prior art.
Figure 2:
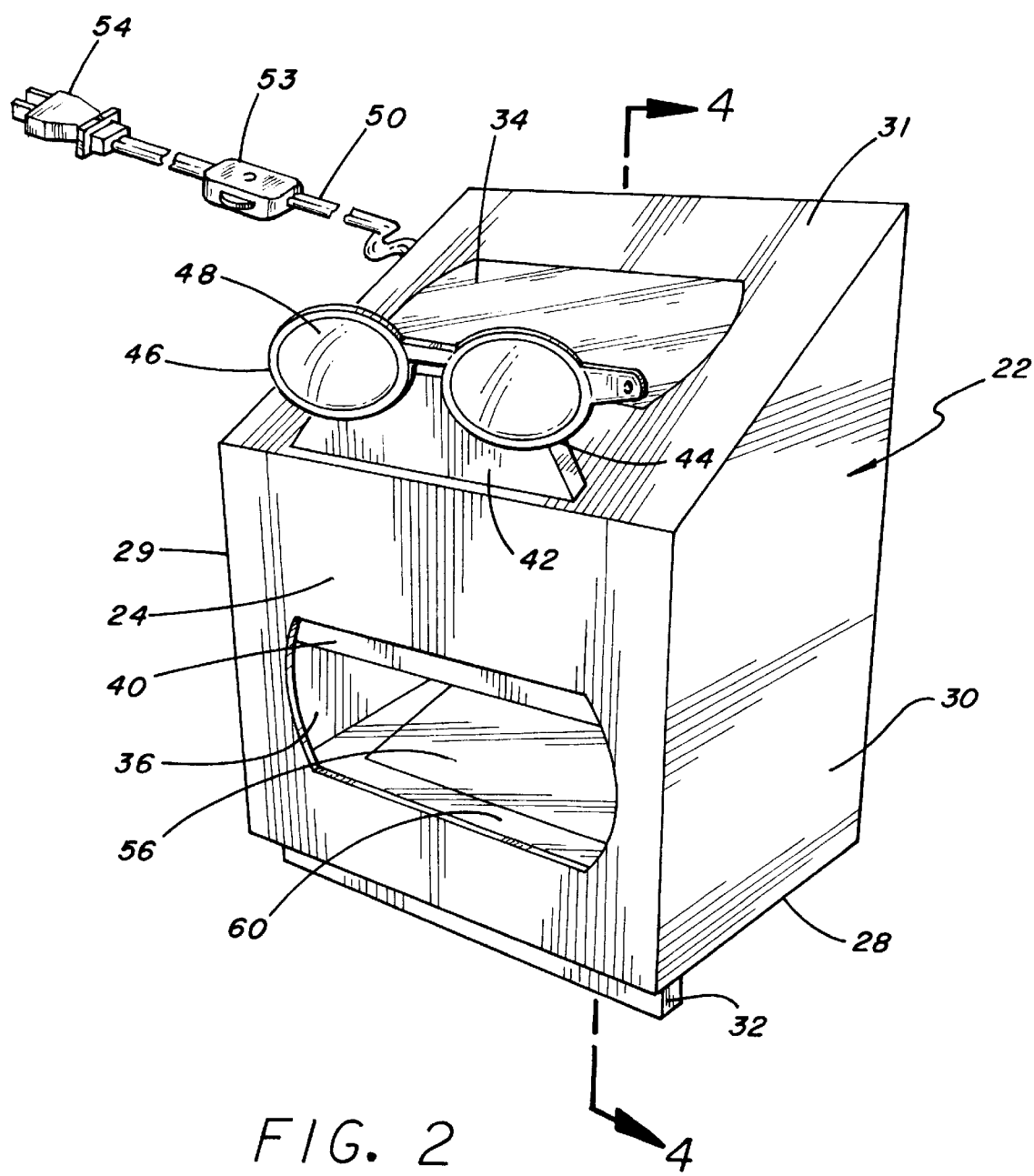
FIG. 2 is a perspective, generally front view, partially in cross section, partially in shadow, of a glare demonstrator of the present invention.
Figure 3:
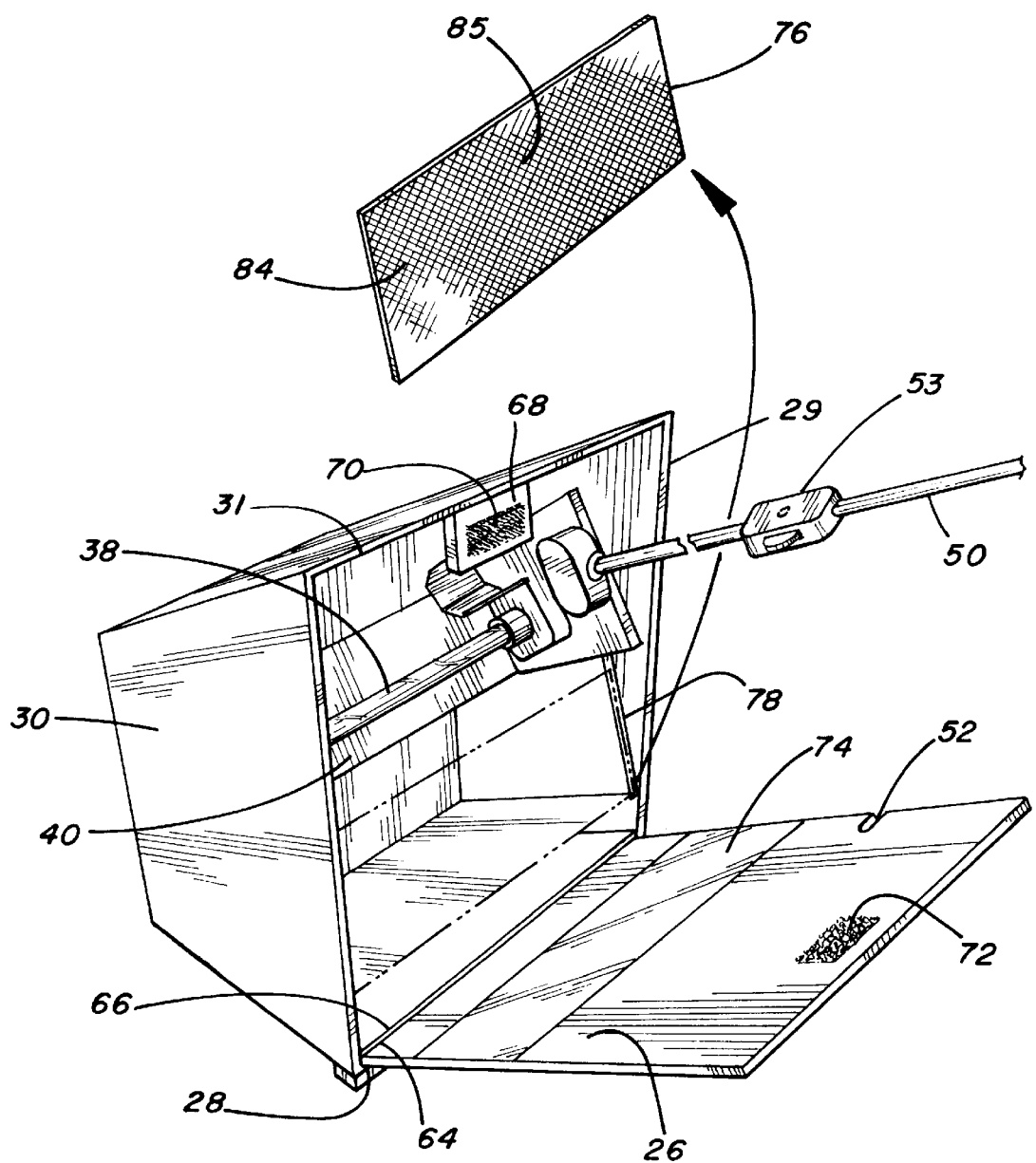
FIG. 3 is a perspective, generally rear exploded view of the device of FIG. 2.

Referring to FIGS. 2 and 3, the glare demonstrator of the present invention includes a housing 22 formed with a front wall 24, rear wall 26, bottom wall 28, a pair of opposing side walls 29 and 30, and top wall 31, and is supported on short corner legs 32. A translucent advertising screen 34 is formed in the top wall 30. The front wall is formed with a window 36 through which one can view a graphic image under veiling glare conditions, as will be described below, provided by a U-shaped fluorescent bulb 38 enclosed by the housing 22. A baffle 40 extends from a top edge of the opening defining the window 36 and extends into the housing 22 at an angle from the front wall 24, serving to shield the eyes of a viewer of the graphic from light coming directly from the bulb 38.

A cradle 42 with a recessed top surface 44 shaped to receive the bottom half of a lorgnette 46 is supported on the front top edge of the housing 22 for convenience of the viewer. The lorgnette 46 is fitted with a pair of lenses 48 that preferably absorb horizontally polarized light.

A light source in the form of a socket base containing the elongate fluorescent bulb 38 is secured to one of the side walls 29. Its electrical cord 50 extends through a crevice 52 in an edge of the rear wall 26, is fitted with a switch 53 and terminates with a plug 54. The light source 38 is disposed above the baffle 40 and is positioned so that a viewer looking into the window 36 has his or her eyes shielded from light coming directly from the bulb 38.

Figure 4:
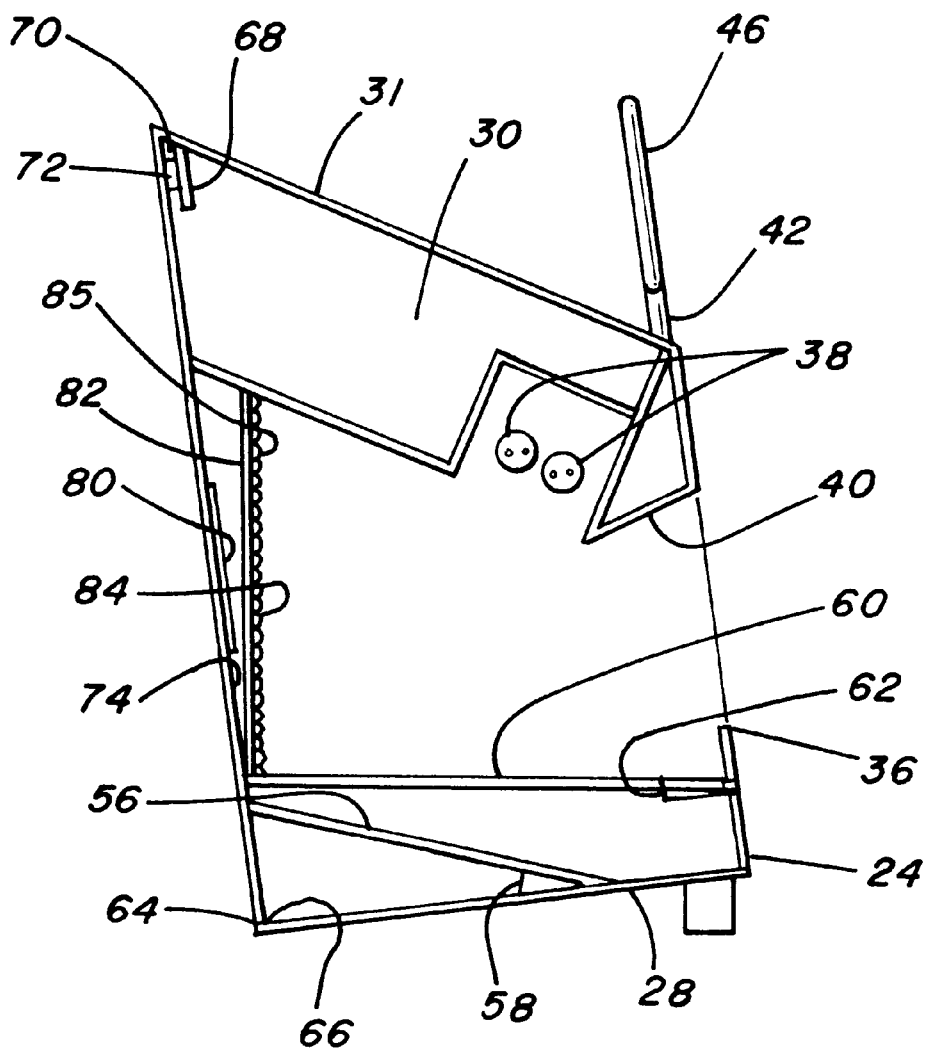
FIG. 4 is a cross-sectional view on line 4—4 of FIG. 2.

Referring additionally to FIG. 4, a graphic 56, which is in the form of a photograph or other pictorial material, is supported within the housing 22 at a first angle 58 from horizontal with respect to the housing floor 28, in this particular embodiment 24°. The graphic angle is set to maximize direct viewing of the graphic through the window 36. It is more significant to set the angle between the directed light and the glare pane to approximate Brewster's angle. Here we have used a combination of the refractive plate's angle and a slight angle on the glare pane to achieve proper orientation. Other configurations will work, too. A glare pane 60 overlies the graphic 56 and is supported by the front wall 24 and side walls 29 and 30 at a second angle 62 from horizontal 10°.

The rear wall 26 has its lower edge 64 inserted into a slot 66 formed along the rear edge of the bottom wall 28, and is shaped to close fit the opening defined by the bottom wall 28, side walls 29 and 30 and top wall 31. A dependent stop 68 extends downwardly from the top wall 31 adjacent the rear opening and carries one-half of a hook and eye fastener 70, such as Velcro, which mates with the corresponding other half of the fastener 72. The rear wall 26 can be removed from the housing by separating the hook and eye fasteners and lifting the rear wall 26 out of the slot 66.

The rear wall 26 is formed at a lower section with a mirrored surface 74, extending from the top of the graphic to about midway up the wall 26. In this case, the mirrored surface is a metalized shiny surface, but any mirror surface can be used. A refractive pane 76 having a height and length dimension approximating the mirrored surface is secured by a pair of slots 78 in the opposite side walls 29 and 30, spaced from the mirrored surface and held in a small angle 80 therefrom, in this case 5° from vertical. The refractive pane 76 is formed of transparent plastic, in this case acrylic, formed flat on its rear side 82 and multi-faceted on its front side 84 with a uniform array of small, closely aligned refractive protuberances 85.

A portion of light from the fluorescent bulb 38 impinges directly on the glare pane 60, penetrating therethrough to the graphic 56 from which it is reflected through the window 36 to the viewer. Another portion of light from the fluorescent bulb 38 is reflected by the mirror surface 74 onto the glare pane 60 and is refracted and reflected thereby resulting in the production of glaring, veiling light, obscuring the image of the graphic. The components are arranged so that the light reflecting from the mirror surface 74 impinges on the glare pane at an angle of incidence such that its reflection from the glare pane is polarized. This angle of incidence is preferably Brewster's angle. The angle of incidence is the angle between an incident ray and a normal to a reflecting or refracting surface. If the incident ray is at Brewster's angle, the reflected ray is completely polarized perpendicular to the plane of incidence. This occurs when the angle between the reflected ray and the refracted ray is 90°. The result is dominantly horizontally polarized veiling glaring light reflected from the horizontal surfaces. Brewster's angle can be calculated from the arctangent of the ratio of the index of refraction of the glare pane material and the index of refraction of air (effectively 1). Brewster's angle is commonly referenced in degrees from the perpendicular. However, for convenience here, the complement (90°— Brewster's angle) is used to describe Brewster's angle as measured from the horizontal. The glare pane can be formed of glass having a Brewster's angle of 33.5°, an acrylic material having a Brewster's angle of 34°, from polycarbonate having a Brewster's angle of 32°, or from other appropriate material.

In the use of the glare demonstrator, a viewer, sitting facing the window 36 perceives the graphic 56 but heavily veiled by glare from the light source 38 that reflects from the mirrored surface 74 through the refractive pane 76. This glare is polarized along the horizontal plane. By placing the lorgnette 46, which has lenses that absorb horizontally polarized light, in front of his or her eyes, the viewer sees a clear view of the graphic undisturbed by any glare. The difference between the views, with and without the polarized lorgnette 46, is dramatic.

Figure 5:
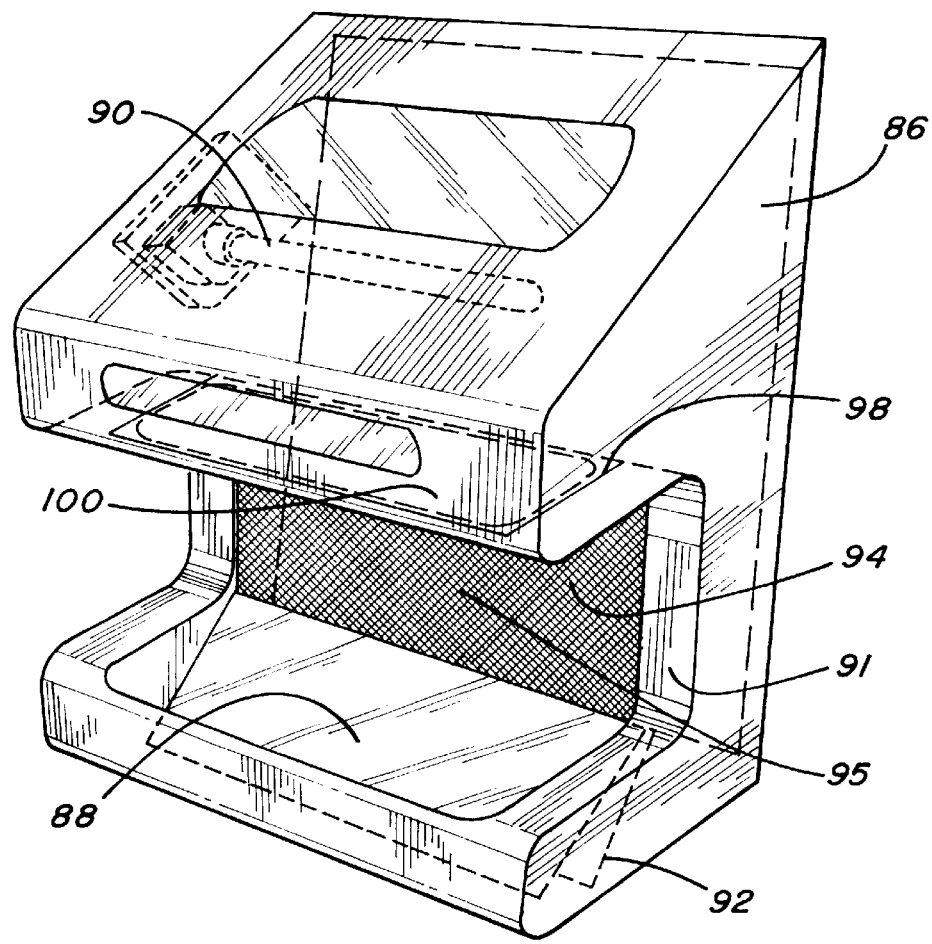
FIG. 5 is a perspective, partially cut-away, partially in shadow, generally frontal view of a second embodiment of the invention.

Referring to FIG. 5 another embodiment of a glare demonstrator is shown of similar construction to the demonstrator of FIGS. 2–4, but in which the housing 86 has a front wall that extends inwardly to overlie the glare pane 88 and underlie the fluorescent bulb 90. The opening is formed to expose the glare pane 88 and underlying graphic 92 to a viewer and permit light from the bulb 90 to be reflected onto the glare pane 88. That reflection is accomplished by an acrylic reflector pane 94 multifaceted on its face with protuberances 95 and formed with a reflecting foil back 96. A window 98 found in the housing beneath the bulb can be covered with a pane 100 of clear material or it can be a refractive pane such as the refractive pane 74 in the embodiment of FIGS. 2–4.

Figure 6:
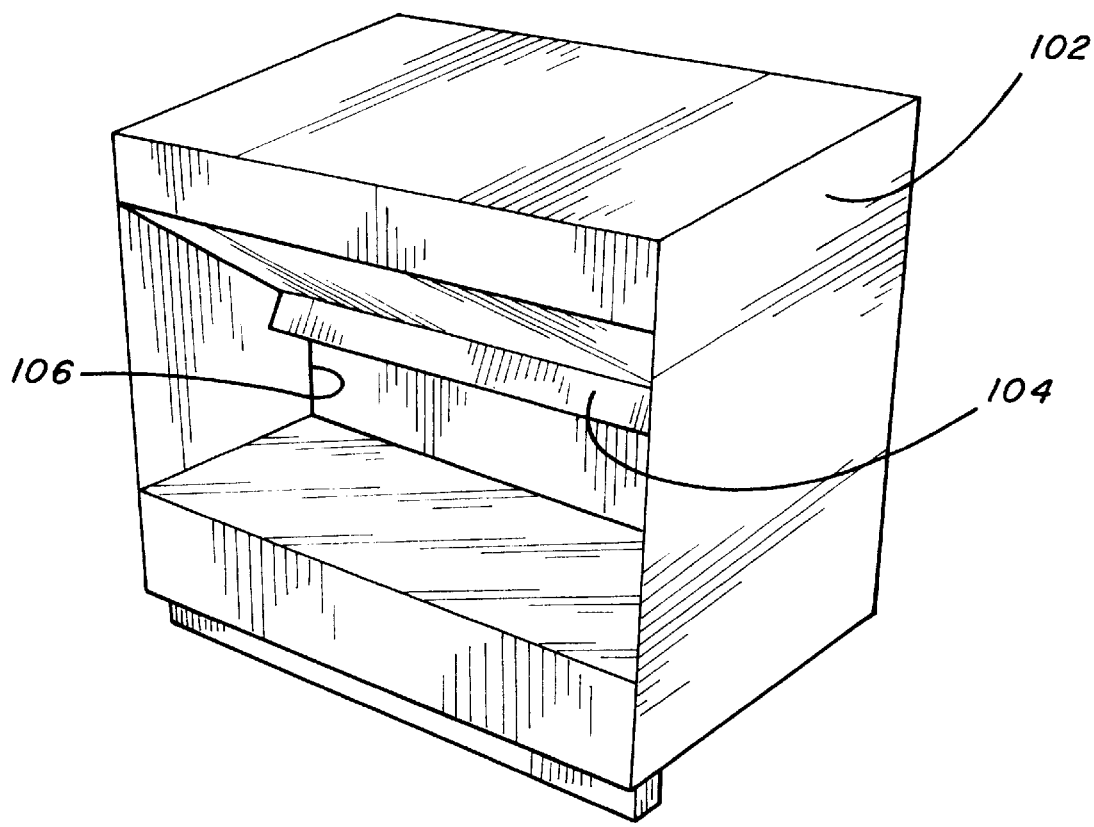
FIG. 6 is a perspective, generally front view of a third embodiment of the invention.
Figure 7:
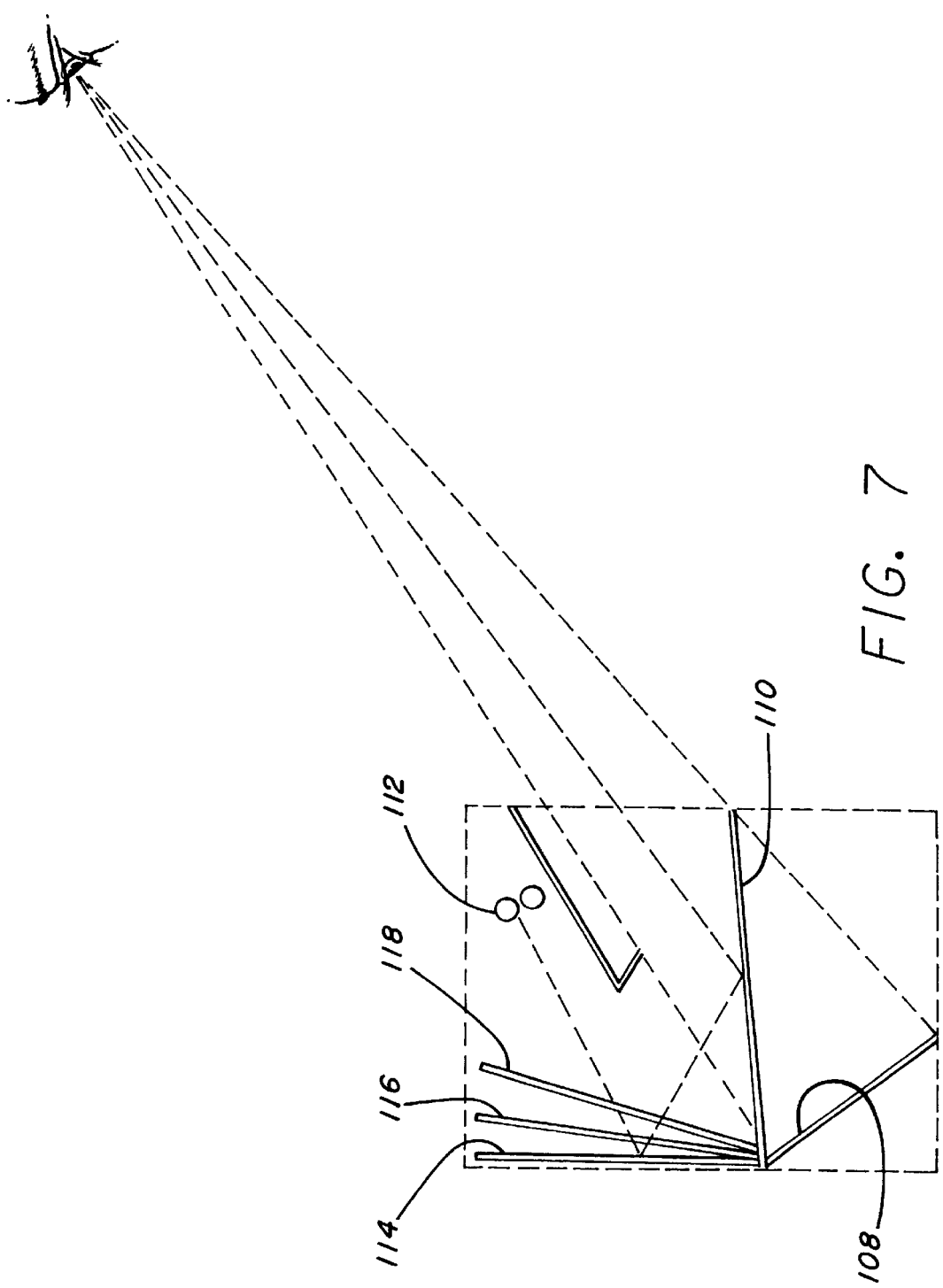
FIG. 7 is a schematic view of the invention taken generally on line 7—7 of FIG. 6.

Another embodiment is shown in FIGS. 6 and 7 wherein a housing 102, formed with a baffle 104 shielding a window 106 enables one to view a graphic 108 through a glare pane 110. In this embodiment, the graphic is illuminated entirely by light from a U-shaped fluorescent bulb 112 reflected by a mirrored surface 114. Also in this embodiment, a pair of refractor panes 116 and 118, formed as the refractor pane 74 of embodiment of FIGS. 2–4, are disposed in front of the mirror surface 114.

In the first two embodiments, light from the bulb directly illuminates the graphic, as well as being the source of scattered light and glare from a refracted element. The reflector and refractor surfaces are important additions to ensure that viewers having different heights, or who are positioned at various angles to the window, experience Brewster's angle reflections and therefore veiling glare. In this embodiment, the graphic is entirely illuminated by the refracted light.

Regardless of the embodiment used, the refractive element or elements need not be placed directly in front of the mirrored surface but may be placed anywhere in the path of light that is to be reflected onto the glare pane. If the refractive pane is placed so that it too reflects light from the fluorescent bulb, then it is not entirely necessary to have a mirrored surface, but it is preferred and results are better with a mirrored surface.

Glare can be increased by placing the demonstrator such that the distorted image from the refractor screen covers the largest portion of the graphic, by using a reflector to control the direction of illumination and increase the amount of glaring light, and by increasing the amount of light that illuminates the graphic. Increasing the reflectance off the surface of the glare pane by using a glare pane of higher refractive index material or by coating it with a higher refractive index material (such as diamond-like carbon) achieves higher contrast between a veiled glare condition and clear perception of the scene through polarizing lenses. Using a graphic with dark, saturated colors, and which does not silhouette images against a light background, and with limited color at maximum visual acuity (yellow-green tint near 556 nm) also achieves higher contrast. Viewing at the Brewster's angle of the glare pane material also can increase contrast. Exact coincidence with Brewster's angle is not entirely critical because multi-directional glare is produced, and a large solid angle is perceived. Nevertheless, viewing at Brewster's angle does give one the highest level of veiled glare that can be eliminated by horizontally absorbing polarized lenses.

One can use alternatives to the foregoing structures. As mentioned above, one need not place the refractive pane in front of the mirrored surface but can place it adjacent and in front of the fluorescent bulb, as long as it is in the path of light being reflected onto the glare pane. In place of a fluorescent bulb, one can use a filament bulb, or even natural light by concentrating incoming light with a mirror or lens element.

In the embodiment of FIG. 5, smoke or frosted side panels can be added if side light illumination is a problem in a particular retail location. Alternatively, to further increase glare, the side panels could be transparent textured reflectors with foil backing, such as obtained using the refractive pane with a coated foil backing.

Alternative to lenses designed to absorb horizontally polarized light, one can also use lenses that only transmit light in one plane of polarization by positioning that plane perpendicular (vertically) to the reflected glare.

We claim:

1. A device for demonstrating the effect of glare and its reduction through use of a polarizing lens, comprising:
   a glare pane formed of a sheet of transparent material;
   a graphic;
   a housing supporting said glare pane over said graphic, said housing having an opening whereby one can view said graphic through said glare pane; and
   a source of light for illuminating said graphic through said glare pane, comprising means for reflecting at least a portion of said light onto said glare pane to reflect from said glare pane at an angle of incidence such that it is polarized and produces glare to one viewing the graphic through said housing opening.

2. The device of claim 1 in which said angle of incidence is at Brewster's angle.

3. The device of claim 1 in which said means for reflecting said portion of light, comprises means for scattering said portion of light.

4. The device of claim 3 in which said means for scattering said portion of light comprises at least one refractive pane, formed of transparent, multi-faceted refractive material.

5. The device of claim 1 in which said means for reflecting said portion of light comprises a mirrored surface.

6. The device of claim 5 comprising means for scattering said portion of light after reflection from said mirrored surface.

7. The device of claim 6 in which said means for scattering said portion of light comprises at least one refractive pane, formed of transparent, multi-faceted refractive material.

8. The device of claim 7 in which said refractive pane is spaced from said mirrored surface.

9. The device of claim 1 in which said housing supports said glare pane at an angle to said graphic.

10. The device of claim 9 in which said housing supports said graphic at a first angle from horizontal and supports said glare pane at a second angle from horizontal, less than said first angle.

11. The device of claim 10 in which said second angle is such that the angle of incidence of said portion of light on said glare panel is at about Brewster's angle.

12. The device of claim 1 in which said source of light is a light bulb disposed in said housing above said glare pane whereby to direct a first portion of light to illuminate said graphic through said glare pane and to direct a second portion off light to reflect from said reflecting means onto said glare pane.

13. The device of claim 12 in which said housing has a front wall defining said opening.

14. The device of claim 13 in which said light bulb is disposed behind said front wall, above said opening.

15. The device of claim 14 including a baffle extending from a top edge of said opening into said housing at an angle from said front wall, whereby to shield the eyes of a viewer of the graphic from light coming directly from said bulb.

16. The device of claim 13 in which the front wall of said housing is planar.

17. The device of claim 13 in which the front wall of said housing extends inwardly to overlie said glare pane and underlie said bulb, said opening being formed to expose the glare pane and graphic to a viewer and permit light from said bulb to be reflected onto said glare pane.

18. The device of claim 12 in which said light bulb is comprised of at least one elongate flourescent bulb.

19. The device of claim 1 in which said glare pane is formed of polycarbonate having an index of refraction such that Brewster's angle is 32 degrees above horizontal.

20. The device of claim 1 in which said glare pane is formed of acrylic having an index of refraction such that Brewster's angle is 34 degrees above horizontal.

21. The device of claim 1 including a cradle shaped to receive the bottom half of a polarized lens lorgnette and supported on said housing.

22. A device for demonstrating the effect of glare and its reduction through use of a polarizing lens, comprising:
   a graphic;
   a glare pane formed of a sheet of transparent material;
   a mirrored surface;
   at least one elongate flourescent bulb disposed whereby a first portion of its light can illuminate said graphic through said glare pane while a second portion thereof can reflect from said mirrored surface onto said glare pane at an angle of incidence such that it is polarized and produces glare to one viewing the graphic through said housing opening;
   a refractive pane, formed of transparent, multi-faceted refractive material, in the path of said second portion of light;

a housing supporting said mirrored surface and said refractive pane, disposing said graphic at a first angle from horizontal and supporting said glare pane over said graphic at a second angle from horizontal, said housing having a front wall defining said opening, said light bulb being disposed behind said front wall, above said opening, said front wall being formed to expose the glare pane and graphic to a viewer while shielding the viewer's eyes from light coming directly from said bulb, whereby one can view said graphic through said glare pane.

23. The device of claim 22 in which said refractive pane is disposed in front of said mirrored surface to scatter light reflected from said mirrored surface.

24. The device of claim 22 in which said angle of incidence is at Brewster's angle.

25. The device of claim 22 in which said housing has a top wall, said device including a cradle shaped to receive the bottom half of a polarized lens lorgnette and supported on the top wall of said housing.

* * * * *